UNITED STATES PATENT OFFICE.

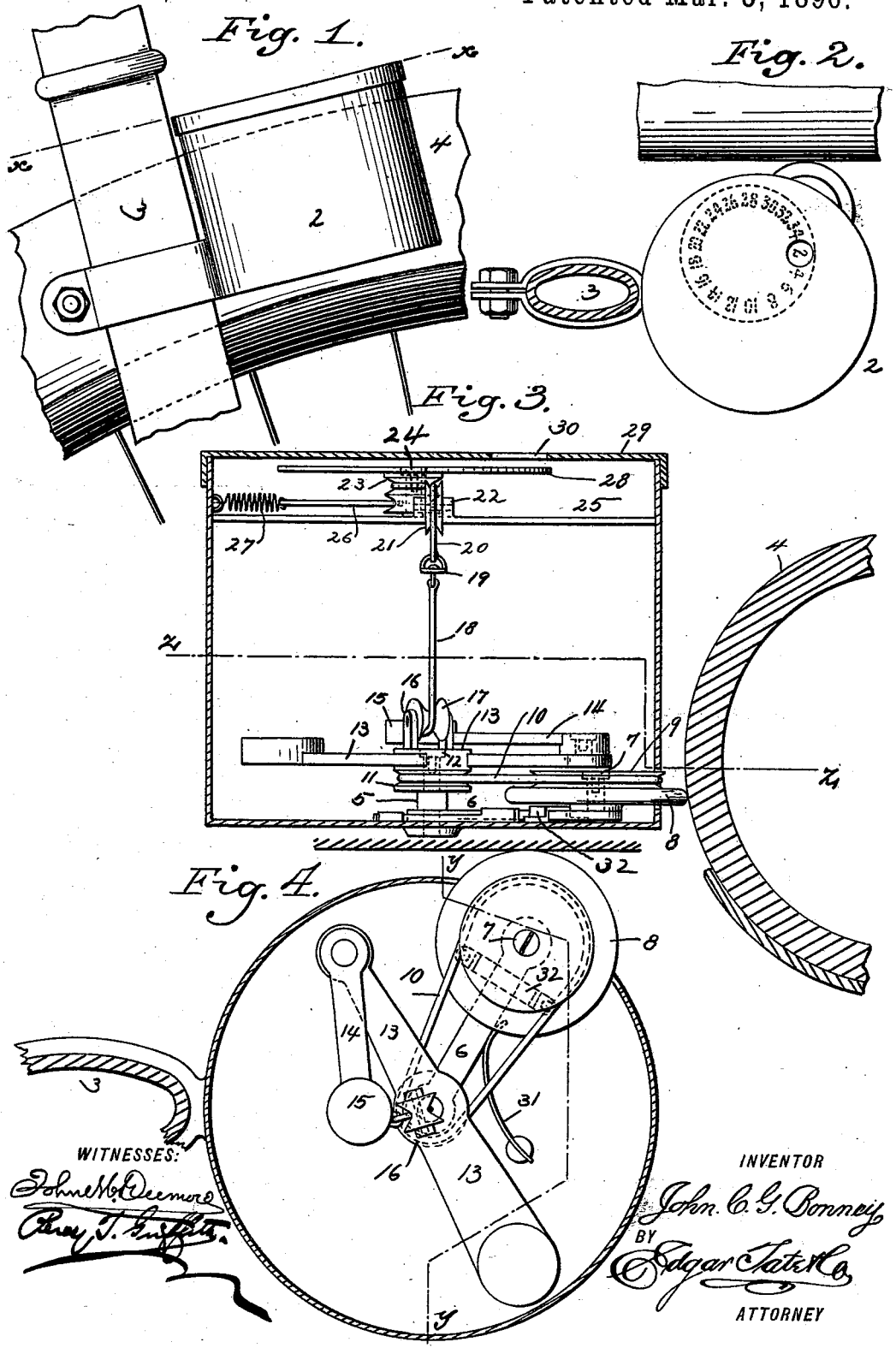

JOHN C. G. BONNEY, OF BROOKLYN, NEW YORK.

SPEED-INDICATOR FOR BICYCLES.

SPECIFICATION forming part of Letters Patent No. 555,492, dated March 3, 1896.

Application filed February 27, 1895. Serial No. 539,841. (No model.)

*To all whom it may concern:*

Be it known that I, JOHN C. G. BONNEY, a citizen of the United States, and a resident of Brooklyn, county of Kings, and State of New York, have invented certain new and useful Improvements in Speed-Indicators for Bicycles, of which the following is a specification, reference being had to the accompanying drawings, forming a part thereof, in which similar numerals of reference indicate corresponding parts in all the figures.

My invention relates to speed-indicators for bicycles, and the object thereof is to produce a simple and effectual device which may be applied to a bicycle in plain view of the rider and by which the exact speed of the bicycle may be determined at all times and the rider enabled at all times to determine the rate of speed per hour at which he is traveling, or even the rate per minute, the device being properly adjusted.

In the accompanying drawings, forming part of this specification, Figure 1 represents in elevation a section of the guide-wheel of a bicycle and a section of the forward fork of the frame and my improved speed-indicator connected with said fork; Fig. 2, a sectional plan view taken on the line $x\ x$ of Fig. 1; Fig. 3, a side elevation of the device with part of the casing removed on the line $y\ y$ of Fig. 4; Fig. 4, a section on the line $z\ z$ of Fig. 3.

Referring to the drawings, the numeral 2 designates my speed-indicator, which is attached to the fork 3 of the front or guide wheel, the rim of which is shown at 4, by means of a split collar, as shown in the drawings. Firmly secured at one end to the bottom of the casing 2, as shown in Fig. 3, and centrally thereof, is a spindle or axle 5, on which is revolubly mounted an arm or lever 6, provided at its outer end with a crank-arm 7, on which is mounted a wheel 8, having a grooved extension 9, designed to receive a power belt or cord 10, which operates in connection with said grooved extension a grooved pulley or wheel 11, revolubly mounted on the inner end of the spindle or axle 5 and held in position thereon by a screw head or nut 12.

The wheel 11 is provided with an arm or plate 13, secured thereto or formed integrally therewith, and preferably of the form shown in Fig. 4, and to one end of which is pivoted a lever 14, having a weighted free end 15, as is also shown in said figure.

Connected with the arm 13 by a bracket 16 is a small pulley 17, over which passes a cord 18, one end of which is connected with the weighted end 15 of the lever 14, as shown in Fig. 4, and the other by means of a swivel-joint 19 with a similar cord 20, which passes over a pulley 21, mounted on a support 22, and from which it passes around and is secured to a pulley 23, mounted on a shaft or axle 24, secured to a partition or plate 25, with which the pulley-support 22 is also connected.

The pulley 23 has separate grooves, in one of which one end of the cord 20 is secured, and the other is adapted to receive one end of a cord 26, provided with a spiral spring 27, which is secured to the casing, as shown in Fig. 3.

Secured to or formed on the pulley 23 is a dial or indicator plate 28, provided with a series of speed-indicating numbers ranging from 2 to 34, and which indicate the speed at which the bicycle is moving per hour. This indicator is arranged just below the top plate 29 of the casing 2 of the body of the indicator, and said plate is provided with a hole 30 through which the plate may be seen by the operator of the vehicle.

Referring again to Figs. 3 and 4, it will be seen that the lever 6, which supports the wheel or pulley 8, is arranged at a slight inclination or angle to the line of movement of the guide-wheel 4, and that said lever is sustained in proper position by a spring 31, secured to the casing of the indicator. The purpose or object of this spring is to keep the lever in the desired position at all times, and the rim of the wheel 8 in contact with the rim of the wheel 4 when the machine is in operation. It will also be observed that the wheel 8 extends through the casing of the device for this purpose, and also that a strap 32, secured to the inner surface of the casing, prevents the lever 6 from being driven too far in a direction opposite to the spring 31; also to prevent vertical movement.

The operation is as follows: The various parts of the device being assembled in the manner described and the regulator attached to the machine and the latter put in motion, the guide-wheel 4 thereof, as it revolves, will, by friction, revolve the wheel 8 held in contact therewith, and this, in turn, will revolve the pulley 11, together with the arm 13 formed thereon, by which movement the pulley 17 is carried around sidewise or in a direction parallel with its axle. As the speed increases, the lever 14 will be thrown outward and draw the cords 18 and 20, the former of which operates over pulley 17 and the latter over pulley 21, while the swivel-joint 19 compensates for the twisting movement given to the cord 18 and prevents the kinking or twisting thereof. The result of this movement of the lever 14 is to revolve the pulley 21, and through it the pulley 23, to which the cord 20 is attached, and this revolves the dial plate or indicator. The pulley 23 cannot be made to turn through more than one revolution because of the manner in which the cord 20 is attached and operated, and the spring-cord 26 and 27 operates to retain the indicator at zero or the normal position, and in connection with the lever 14 to return the indicator-plate to its normal position when the machine is stopped, as well as to steady the movement of the dial.

From the foregoing it will readily appear that the exact speed of the machine may be given and the operator enabled at all times to determine the rate per hour at which he is traveling, or even the rate per minute, the operating-pulleys and indicator being properly sized and adjusted, and it is also evident that many changes in the construction and combination of parts herein shown and described may be made without departing from the scope of my invention, and I do not, therefore, limit myself to the forms shown; but, Having fully described my invention, its construction and operation, I claim, and desire to secure by Letters Patent, the following:

1. In a speed-indicator for bicycles, the combination with a casing or frame, of a shaft secured therein, a pulley mounted on a lever connected with said shaft, and carrying a wheel or pulley adapted to be operated by the guide-wheel of the bicycle, a pulley or wheel mounted on said shaft, a pulley provided with an indicator-plate also mounted in said frame, and operative connections between the wheel on the shaft, the wheel on the lever, and the pulley carrying the indicator-plate, substantially as shown and described.

2. In a speed-indicator for bicycles, the combination with a casing, of a shaft therein, one end of which is secured to the casing, a lever mounted on said shaft and adapted to be operated by the guide-wheel, a wheel or pulley mounted on the shaft and provided with an arm, as 13, to which is pivoted a lever, a pulley connected with said arm, another pulley mounted in said casing and carrying an indicator-plate, and operative connections between all of said pulleys, whereby the device is operated by the guide-wheel of the bicycle, substantially as shown and described.

3. In a speed-indicator for bicycles, the combination with a casing or frame, of a shaft or axle one end of which is secured to said frame, a lever mounted thereon and provided with a pulley or wheel adapted to be operated by the guide-wheel of the bicycle, a pulley or wheel provided with an arm, as 13, mounted on said shaft, a lever pivoted at one end to said arm, a pulley connected with said arm, a series of pulleys adjacent to each other and supported within said casing, one of which carries an indicator-plate, and said wheels and pulleys being connected and operated by cords or belts, substantially as shown and described.

4. In a speed-indicator for bicycles, a casing or frame of any desired form or construction, mounted on the forward fork of the bicycle adjacent to the guide-wheel, a shaft located therein, a lever mounted on said shaft, a wheel on said lever adapted to be operated by the guide-wheel of the bicycle, which contacts therewith, a spring operating in connection with said lever to hold the wheel in contact with the guide-wheel, of the bicycle, a pulley mounted on said shaft and in operative connection with said wheel, a pulley supported within the frame and carrying an indicator-plate and operative connections between the parts specified, substantially as shown and described.

5. In a speed-indicator for bicycles, the combination with a frame or casing, secured to the forward fork of the bicycle, adjacent to the guide-wheel, of a shaft secured in said casing, a pulley mounted thereon, a lever connected with the shaft and provided with a wheel mounted thereon, and adapted to be operated by the guide-wheel of the bicycle, said pulley being provided with an arm, a lever pivoted at one end to said arm, a pulley connected with the pulley on the shaft, another pulley connected with the casing and carrying an indicator-plate, said pulleys and lever being connected and operated by a cord secured to the pulley carrying the indicator-plate, and passing over the others, and connected with the free end of the pivoted lever, said cord being provided with a swivel connection, substantially as shown and described.

6. In a bicycle, the combination, with a casing or frame, of a shaft secured therein, a pulley mounted thereon, a lever connected with said shaft and carrying a wheel or pulley adapted to be operated by the guide-wheel of the bicycle, a pulley or wheel mounted on said shaft, a pulley provided with an indicator-plate also mounted in said frame, and operative connections between the wheel on the shaft, the wheel on the lever and the pulley carrying the indicator-plate, and an opening through the top of the casing above said plate, substantially as shown and described.

7. In a speed-indicator for bicycles, the combination, with the casing or frame, of a shaft therein, one end of which is secured thereto, a lever mounted on said shaft and carrying the wheel or pulley adapted to be operated by the guide-wheel of the bicycle, a wheel or pulley mounted on said shaft and adapted to be operated by the wheel or pulley on the lever, the wheel on the shaft provided with an arm, as 13, to which is pivoted a lever, as 14, and also supporting a pulley, as 17, another pulley, as 21, secured in the said casing, a pulley, as 23, carrying an indicator-plate also mounted in said casing, and a cord connected with the free end of the lever 14 and extending over the pulley 17 connecting with the wheel or pulley on the shaft, and over the pulley 21, and around the pulley 23 carrying the indicator-plate, and a cord provided with a spring also connected with the pulley carrying the indicator-plate, and with the casing, substantially as shown and described.

In testimony that I claim the foregoing as my invention I have signed my name, in presence of two witnesses, this 23d day of February, 1895.

JOHN C. G. BONNEY.

Witnesses:
PERCY T. GRIFFITH,
C. GERST.